United States Patent
Büllesbach et al.

(10) Patent No.: US 12,258,219 B2
(45) Date of Patent: Mar. 25, 2025

(54) SUPPORT OF A TRACK FLOOR CONVEYOR, AND TRACK FLOOR CONVEYOR WITH SUPPORT

(71) Applicant: Strothmann Machines & Handling GmbH, Schloss Holte-Stukenbrock (DE)

(72) Inventors: Tim Büllesbach, Werther (DE); Dominik Schaffrinski, Detmold (DE); Stefan Rehling, Bückeburg (DE)

(73) Assignee: Strothmann Machines & Handling GmbH, Schloss Holte-Stukenbrock (DE)

( * ) Notice: Subject to any disclaimer, the term of this patent is extended or adjusted under 35 U.S.C. 154(b) by 83 days.

(21) Appl. No.: 18/280,339

(22) PCT Filed: Feb. 18, 2022

(86) PCT No.: PCT/EP2022/054078
§ 371 (c)(1),
(2) Date: Sep. 5, 2023

(87) PCT Pub. No.: WO2022/189123
PCT Pub. Date: Sep. 15, 2022

(65) Prior Publication Data
US 2024/0067454 A1    Feb. 29, 2024

(30) Foreign Application Priority Data
Mar. 12, 2021    (DE) .......................... 102021001337.9

(51) Int. Cl.
*B65G 41/00*  (2006.01)
*B65G 17/34*  (2006.01)
(Continued)

(52) U.S. Cl.
CPC .......... *B65G 41/003* (2013.01); *B65G 17/34* (2013.01); *B65G 41/02* (2013.01); *B60B 17/0089* (2013.01); *E01B 25/28* (2013.01)

(58) Field of Classification Search
CPC ...... B65G 41/003; B65G 17/34; B65G 41/02; B60B 17/0089; E01B 25/28
See application file for complete search history.

(56) References Cited

U.S. PATENT DOCUMENTS 3,408,950 A * 11/1968 Puhringer ................ B61K 5/02
                                                        246/456
3,845,718 A * 11/1974 Rogers .................... B61C 13/00
                                                        104/96

(Continued)

FOREIGN PATENT DOCUMENTS

DE          4318383 C1    7/1994
DE    202019100904 U1    5/2020
(Continued)

OTHER PUBLICATIONS

Strothmann Machines & Handling GMBH, "Spurgeführte FTS van Strothmann—Präzision und Energieeffizienz bei der Fliessmontage bis 100 t," Jul. 9, 2020, retrieved from the Internet www.youtube.com/watch?v=OiNpp32zf6g, on May 30, 2022, see in particular 11:35 to 12:15, hollow carrier. (translated to Track-guided AGV from Strothmann—precision and energy efficiency in line assembly up to 100 t).

*Primary Examiner* — Mark A Deuble
(74) *Attorney, Agent, or Firm* — Richard M. Goldberg

(57) ABSTRACT

A support (2) of a track floor conveyor (1), including a hollow profile (3), of which at least one hollow space (4) is enclosed by a wall (5), in which the wall (5), on the side adjoining the track (11), has at least one groove-shaped depression in which the axle or the axle bearing (9) of one (Continued)

or more wheels (8) can be accommodated, and the wall (5) has a recess (7) for at least a part of a wheel (8).

16 Claims, 4 Drawing Sheets

(51) Int. Cl.
*B65G 41/02* (2006.01)
*B60B 17/00* (2006.01)
*E01B 25/28* (2006.01)

(56) References Cited

U.S. PATENT DOCUMENTS

| | | | | |
|---|---|---|---|---|
| 4,318,264 | A * | 3/1982 | Rewitzer | B65B 27/125 |
| | | | | 53/436 |
| 5,495,809 | A * | 3/1996 | Carbo | B65G 7/04 |
| | | | | 105/220 |
| 5,857,413 | A * | 1/1999 | Ward | B23Q 7/1436 |
| | | | | 104/301 |
| 6,217,652 | B1 * | 4/2001 | Okubo | B05C 3/10 |
| | | | | 118/66 |
| 6,681,702 | B1 * | 1/2004 | Nicely | A47B 53/02 |
| | | | | 105/157.1 |
| 2002/0029717 | A1 * | 3/2002 | Strothmann | B61J 1/10 |
| | | | | 104/106 |
| 2023/0249912 | A1 * | 8/2023 | Wagner | B65G 1/0492 |

FOREIGN PATENT DOCUMENTS

| | | |
|---|---|---|
| EP | 1155937 A2 | 11/2001 |
| WO | 2014/032699 A1 | 3/2014 |

* cited by examiner

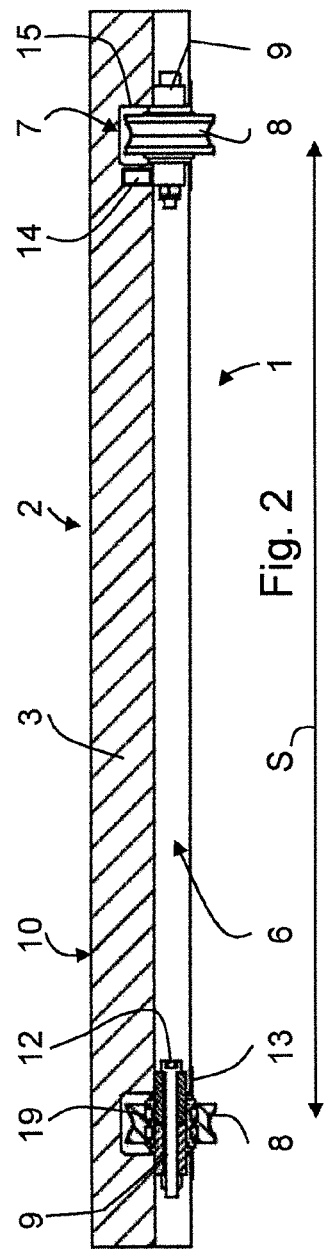
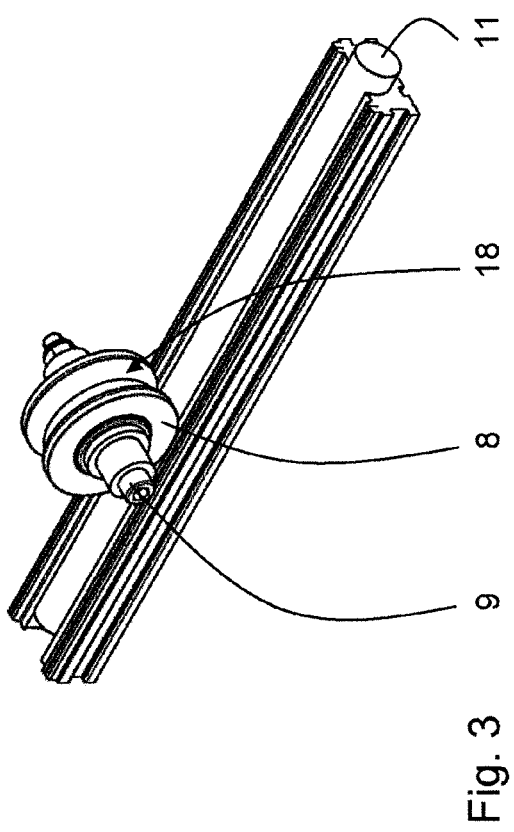

SUPPORT OF A TRACK FLOOR CONVEYOR, AND TRACK FLOOR CONVEYOR WITH SUPPORT

BACKGROUND OF THE INVENTION

The invention relates to a support of a track floor conveyor, which comprises a hollow profile, the at least one hollow space of which is enclosed by a wall.

The invention, moreover, relates to a track floor conveyor with such a support made of tracks, the wheels of which conveyor come in contact with at least one pair of tracks and upon which it is displaceable, wherein a load can be loaded on a loading area of the track floor conveyor.

The aforementioned tracks (pairs of tracks) are primarily, however not limited to, the tracks according to DE 4318383 C1 or to WO 2014/032699 A1 distributed by the Applicant. This type of round tracks has proven itself in practice since they are simply constructed and easy to manufacture. Moreover, a track floor conveyor (hereinafter referred to in short as floor conveyor) with concave wheel bearing surfaces can safely be guided over the round profile. The particular shape of the castors enables a very minimal rolling resistance and a precise control of the system. Even objects weighing tons can be moved by hand. A further advantage for manufacturing halls is that the track can be laid out almost flush with the floor, so that the freedom of motion of other vehicles is not impeded. In contrast to U-shaped tracks, in which the wheels of the floor conveyor travel, the danger of contamination of the tracks is significantly reduced.

The floor conveyor and system of tracks are frequently used for continuous flow manufacturing. This means that the floor conveyor is loaded with a load, driven to various further stations, where the load is processed and subsequently unloaded again.

These loads can vary significantly in weight and dimensions from point of use to point of use. In the manufacture of these floor conveyors, it is necessary to build individually manufactured vehicles depending on the desires of the user. Today, these generally feature welded steel frame constructions, the dimensions of which align with the size of the loads to be transported. These frame constructions should be correspondingly rigid and impervious to thermal impacts, which generally leads to high weight.

Wheel cassettes are currently being built of a type and in a manner that is indeed satisfactory if however complex, with one or a plurality of wheels with bearings, which must be connected with the previously created steel frame construction. Such a cassette case is disclosed by way of example in DE 20 2019 100 904 U1. Understandably, the track width of the tracks must be strictly adhered to.

SUMMARY OF THE INVENTION

The task of the invention is to simplify the construction and the manufacturing complexity of a track floor conveyor.

The task as regards the support of a track floor conveyor is achieved with the features of the claims, and, in particular, solved in that the wall has at least one groove-shaped depression on the side adjacent to the tracks, in which depression the axle or the axle bearing of one or a plurality of wheels can be accommodated and the wall comprises a recess for at least one part of a wheel.

It is thereby possible to countersink the axle or an axle bearing in the support and fix it there. In any event, the wheel axle is accommodated in the depression and is thereby protected from contamination and collisions. A downward opening in the width of the wheel axles or wheel bearings is needed in the area for accommodation of the wheel bearings for the depression. The wheel axles or wheel bearings can then simply be inserted in the depression, if there is a recess, by way of example, a milling of the material in the support profile for the wheel itself. The recess is located in the area of the hollow profiles or alternatively in the place of the support, which in subsequent operation of the floor conveyor is precisely above a track. It is also advantageous if the support exhibits a length that overlaps the track gauge. Since the track gauge is known, a recess for at least a part of a wheel is then provided in the wall at a distance from the track gauge.

It is advantageous when the depression extends over the support length.

In this case, only one support profile is necessary to build a floor conveyor for various track gauges. Depending on the size of the recess for the wheels, it is possible for the wheels to even be displaceable to change the track gauge when needed. Is so doing, the axle remains in the depression.

Preferably, the outer contour of the depression is adapted to the contour of the axle or of the axle bearing of one or a plurality of wheels. As a consequence, the axle or the axle bearing can be inserted into the depression from the outside of the support and fixed there, for example, with retaining means. An axle usually has a circular-shaped cross-section, so that the depression in the wall is sensibly configured to be semicircular at its deepest point. The same applies if an axle bearing is used, that is present, for example, in the shape of a ball bearing or roller bearing about an axle journal on the wheel. It is also, however, possible to configure the depression to be at least almost rectangular so that a small bearing block can be accommodated in it.

The support can advantageously comprise a detachable clamping device for the axle or the axle bearing.

If a detachable clamping device is used instead of the potential screwing down of the retaining means for the axle or axle bearing, it is possible that the wheel spacing can once again be adjusted to the track width of the tracks.

A depression spanning tab is provided as simple and advantageous possibility, with which tab the axle or the axle bearing can be set in depression.

Such a tab can be fastened into the wall of the hollow profile by means of a simple screw connection and fixes the wheel by spanning the place of assembly.

At least one pressure or force sensor is preferably integrated in the depression between the wall and the axle or the axle bearing.

Such a sensor is used to detect the forces on the wheel or wheel bearing. In the case of overly high loads, the bearing could suffer damage, and in this case an alarm can be triggered by the sensors. In the case of the presence of a plurality of pressure or force sensors, which is to say, by way of example, under four wheels, it is thereby possible to detect uneven weight distribution of the load over the loading area of the floor conveyor.

It is advantageous if the recess of the wall comprises an encapsulation for the wheels.

In so doing, no contamination from the wheels can end up in the hollow space of the support.

It is preferable when the hollow profile comprises an extruded profile.

Such a profile is simple to manufacture. As a rule, it should be produced out of aluminum or an aluminum alloy. These are adjustable as regards degree of rigidity and in dimensions, and are today simple to procure as purchased parts and can easily be screwed together with suitable fasteners. The heretofore customary welding work in the case of sheet metal and steel profile frames can be dispensed with. Such an extruded profile is also significantly lighter than a sheet metal welded construction that is comparable as regards rigidity. At the ends, it can be sealed by means of a cap.

Alternatively, it is preferable when the hollow profile comprises a pultrusion profile.

Here too, a lightweight material is used for the hollow profiles, in particular fiber reinforced plastics. These hollow profiles can also comprise sealing caps at the ends.

A useful effect is experienced when the support comprises further depressions in the shape of undercut grooves, to which further components belonging to the track floor conveyor can be fastened with slot nuts.

These grooves can generally be integrated in the extrusion or pultrusion profiles in the manufacturing process. The most varied objects are readily attachable by means of these grooves, something that would entail an increased complexity in the case of welded constructions. This could include signs, lighting fixtures, connection tabs or optionally even pull rods or coupling rods.

The hollow space is advantageously filled with a material for the stiffening of the support.

In particular, curable plastics and foams come into question as filling materials, which are lightweight but can significantly contribute to the rigidity and to a reduction of deflection in the case of wide floor conveyors.

As regards the track floor conveyor, the task is solved in that it comprises at least one support as described here above.

Accordingly, it is possible to have one individual support or a plurality of coupled supports, depending on the desired dimension of the floor conveyor or alternatively of the load to be transported.

It is advantageous if the track floor conveyor is covered with a support plate, which can accommodate the load to be transported.

This support plate can, for example, be releasable and be replaced by means of a smaller or larger support plate. It can comprise centering pins. Optionally, two supports are then correspondingly spaced apart.

It is also advantageous if two or more hollow profiles are arranged connected one above the other.

This allows the height of the floor conveyor to be changed. Processing steps are often carried out manually on the floor conveyors on the load to be transported. With a change in the height of the floor conveyor, different working heights can, for example, be configurable. The hollow profiles can have the same cross-section, wherein the length does not need to be identical.

In the everyday operation of the now very lightweight floor conveyor, it can be advantageous if it comprises at least one conveyor roller and a handle for manual transport.

In particular, if the track transport of the floor conveyor, all the way to the loading and unloading station, takes place only in one direction, the empty floor conveyor can therefore manually be driven back to the starting position due to its low weight.

BRIEF DESCRIPTION OF THE DRAWINGS

Hereinafter, the invention will be elucidated with reference to the illustrative drawings. Wherein:

FIG. 2 shows a cross-section through the support from FIG. 1 with a partial cross-section through a wheel, FIG. 3 shows a three-dimensional representation of a wheel including wheel axles on a round track.

DETAILED DESCRIPTION

Figure 1:
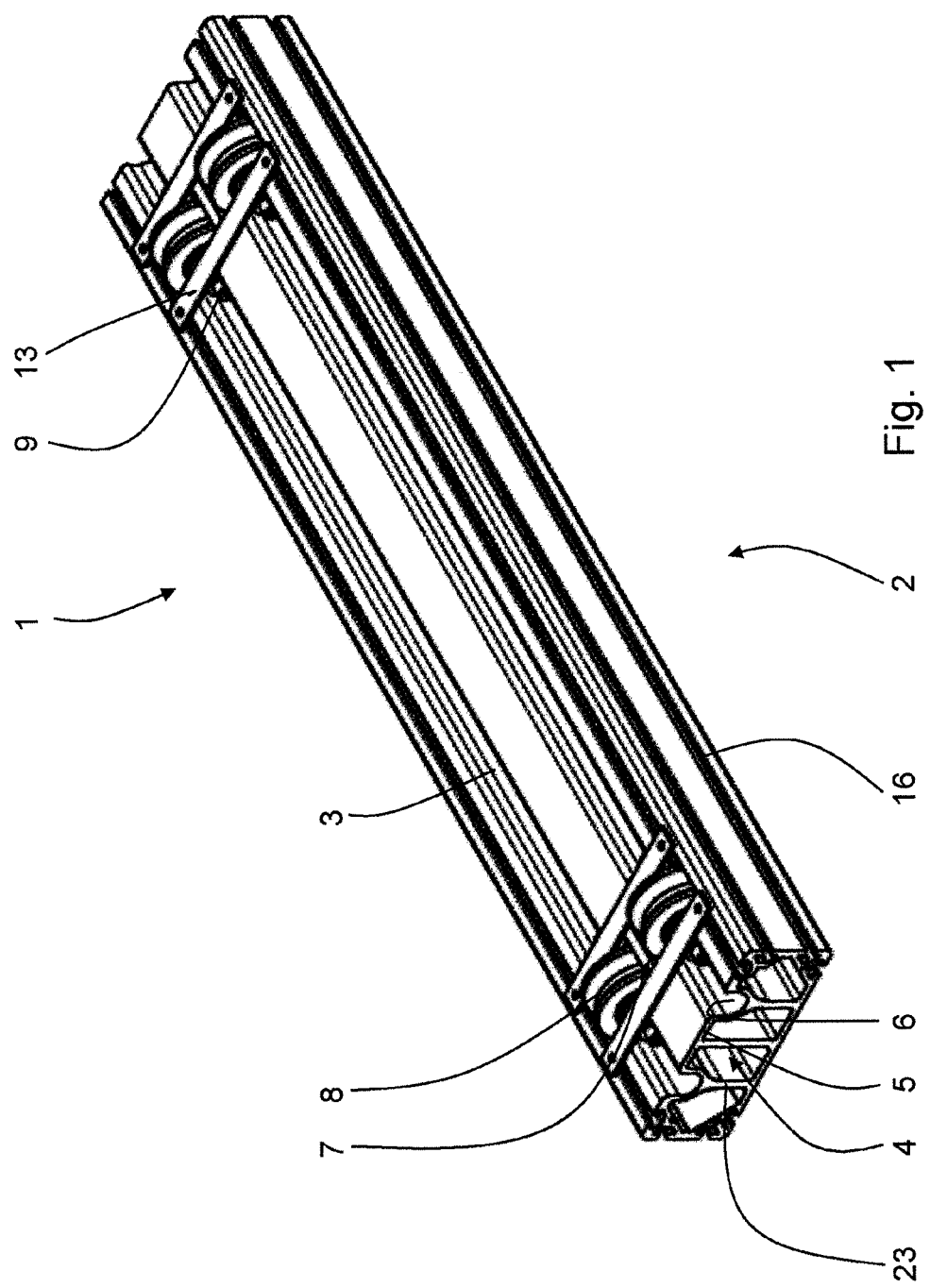
FIG. 1 shows a three-dimensional view, substantially from the bottom side, of the support according to invention fitted with wheels.

A support according to the invention is represented in FIG. 1 in three dimensional shape, which embodies a very narrow floor conveyor 1 when fitted with wheels. The view therefore focuses primarily on the bottom side of the support 2.

The hollow profile 3 is clearly recognizable as an extrusion profile, preferably made of aluminum or an aluminum alloy. Alternatively and graphically represented in the same way, it could also be a pultrusion hollow profile made out of fiber reinforced plastics. The view of the end face allows for the recognition of the hollow spaces 4. They are surrounded on the outside by the wall 5 and in this embodiment example can also comprise struts 23 for reinforcement of the hollow profiles 3. The at least one hollow space 4 can moreover be filled with a material for reinforcement of the support 2.

The wall 5 comprises a depression 6 that extends over the whole length of the hollow profile length. The contour of the depression is precisely adapted to the axle 9 of the wheel 8. The profile of the depression could also be configured in such a way that a bearing of the wheel 8 could also be accommodated therein. In this embodiment example the wheel axles are fixed by means of tabs 13, however optionally still rotatable.

FIG. 1 illustrates a support 2, that is fitted with a total of four wheels 8, two on each side, at precisely the distance of the track gauge of the track, upon which the floor conveyor provided with the support is intended to travel. This unit already represents a narrow floor conveyor.

FIG. 2 illustrates a longitudinal cross-section through the support 2 according to FIG. 1 and on top of that through one wheel (on the left hand side). The narrow floor conveyor 1 therefore has four wheels 8 (of which only 2 are visible) and one weight bearing surface 10. The recess 7 for a part of the wheel 8 in the hollow profile 3 can be better recognized in this view. The recess 7 can also be provided with an encapsulation 15 to the hollow profile 3, so that no contamination from the wheels can make its way in the hollow profile 3. The axles 9 of the wheel 8 are positioned precisely in the depression 6. A pressure or force sensor 14 is moreover indicated on the right hand side, with which sensor the load on the floor conveyor can be determined.

The cross-section through the wheel including the wheel axle should represent a possibility of how the wheel 8 is arranged in the depression 6. A clamping device 12 is thereby indicated, which with the tightening of a screw brings the axle to tightly fit against the side walls of the depression. The tab 13 further ensures against a falling out of the wheel from the depression. The wheel itself rotates on a small roller bearing 19 on the axle 9.

The advantage that the concavely turned wheel circumference 18 offers when it is in contact with a round track 11 distributed by the applicant can be recognized in FIG. 3. Notwithstanding that the track can be countersunk into the ground and does not represent a trip hazard or obstacle, the wheel 8 is nonetheless guided safely and stably in the trackway. Even the heaviest loads can be safely transported on the thus created lightweight floor conveyor with this arrangement.

Figure 4:
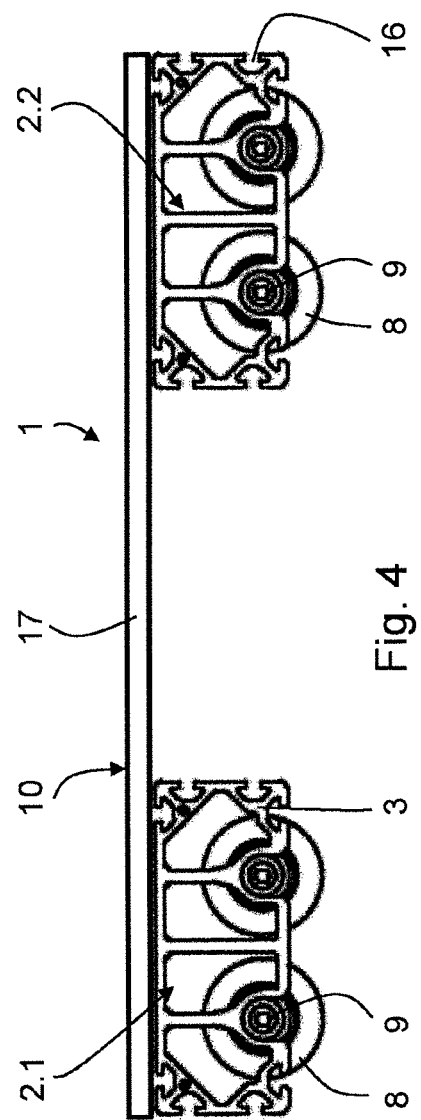
FIG. 4 shows a side view of a floor conveyor according to the invention.

In order to show the variety of possible applications of the support 2 according to the invention, two such supports 2.1 and 2.2 are illustrated in FIG. 4 provided with a support plate 17. With corresponding centering and connecting elements which are not shown, a floor conveyor 1 with a large conveying surface can in this way be created. The connecting elements can be fastened, for example, with slot nuts in the undercut grooves 16 present on the hollow profile 3.

Figure 5:
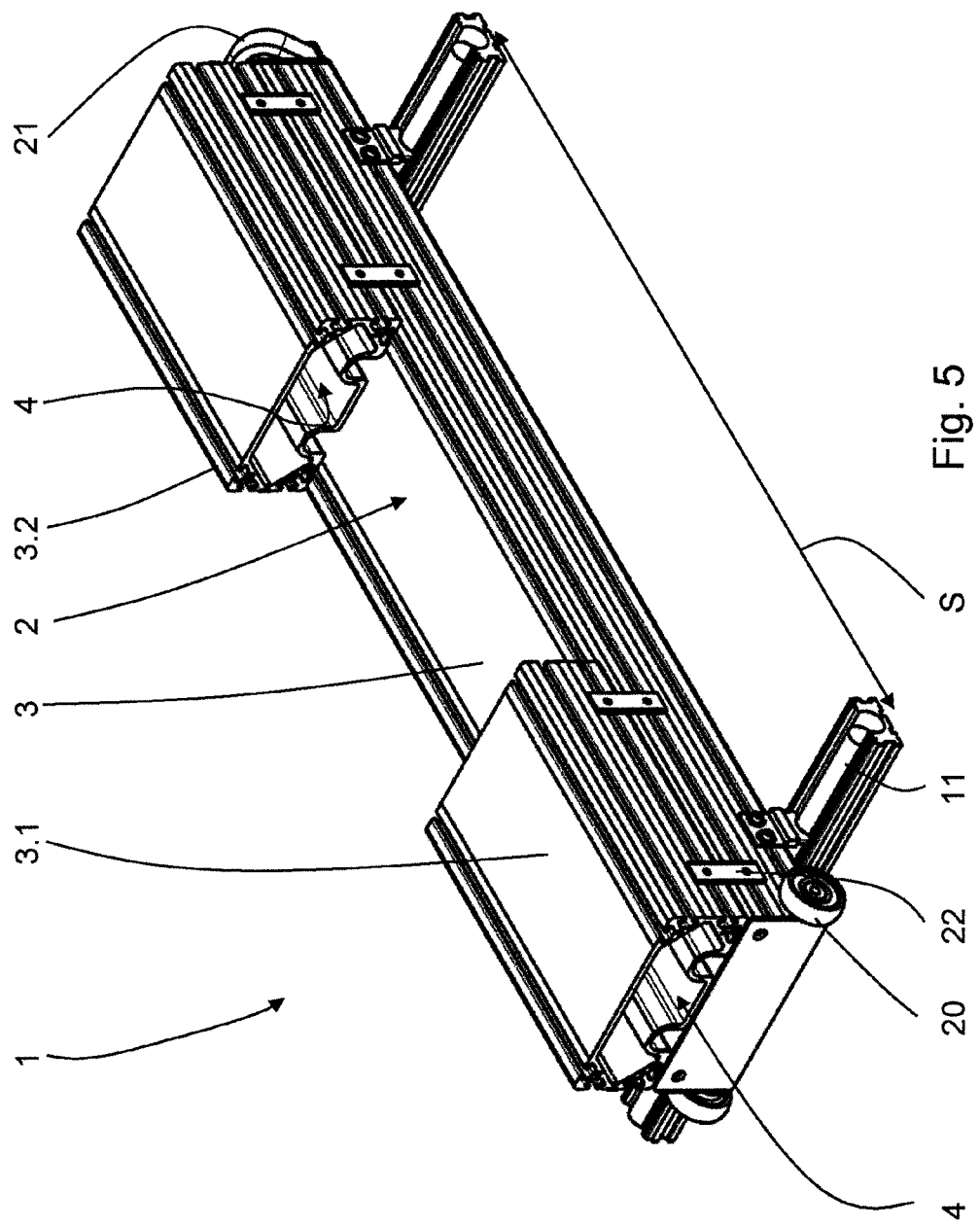
FIG. 5 shows two hollow support profiles arranged one above the other for changing of the height.

FIG. 5 illustrates that the height of the floor conveyor 1 can also be changed via the hollow profiles 3, namely by preferably placing same hollow profiles 3, 3.1, 3.2 on top of each other and also fixing them with connection tabs 22, which are, for example, fastened by means of slot nuts in undercut grooves 16.

Since the entire floor conveyor 1 has become a relatively light vehicle due to the use of hollow profiles, even if it is not carrying a load, it can be moved by only one person away from the tracks 11 with the gauge S. For this purpose, in this embodiment example according to FIG. 5, additional conveyor rollers 20 and a handle 21 are attached to the floor conveyor. With the handle, the floor conveyor is raised on one side until the rollers sit on the hall floor and the wheels 8 are lifted from the track 11. The floor conveyor 1 can then be pushed manually to another location.

The hollow profile 3 can itself represent the support 2. Furthermore, the hollow profile 3 overlaps both tracks. The hollow profile 3 itself thus has a length that overlaps the track gauge of the tracks 11.

The support 2 is preferably configured as a single piece and is manufactured without seams.

REFERENCE SIGN LIST

1 Track floor conveyor
2, 2.1, 2.2 Support
3, 3.1, 3.2 Hollow profile
4 Hollow space
5 Wall
6 Depression
7 Recess
8 Wheel
9 Wheel axle or wheel bearing
10 Weight bearing surface
11 Track, round track
12 Clamping device
13 Tab
14 Pressure or force sensor
15 Encapsulation
16 Undercut grooves
17 Support plate
18 Concave wheel circumference
19 Roller bearing
20 Conveyor roller
21 Handle
22 Connection tab
23 Strut
S Track gauge

What is claimed is:

1. A support of a track floor conveyor for riding on a track, comprising:
a hollow profile having at least one hollow space enclosed by a wall,
wherein the wall comprises at least one groove-shaped depression on a side adjoining the track,
wherein the at least one groove-shaped depression is adapted to accommodate one of an axle or axle bearing of at least one wheel, and
wherein the wall comprises a recess for receiving at least part of the at least one wheel.

2. A support according to claim 1,
wherein the support has a length that overlaps a track gauge and
wherein, in the wall at a distance from the track gauge, the recess is respectively provided for at least a part of the at least one wheel.

3. A support according to claim 1, wherein the depression extends over the length of the support.

4. A support according to claim 1, wherein the depression has an outer contour adapted to an outline of the one of the axle or the axle bearing of the at least one wheel.

5. A support according to claim 1, further comprising a detachable clamping device for the one of the axle or the axle bearing.

6. A support according to claim 1, further comprising at least one tab spanning the depression, with which tab the one of the axle or the wheel bearing is adapted to be fixed in the depression.

7. A support according to claim 1, further comprising at least one pressure/force sensor integrated in the depression between the wall and the one of the wheel axle or wheel bearing.

8. A support according to claim 1, wherein the recess of the wall comprises an encapsulation for the at least one wheel.

9. A support according to claim 1, wherein the hollow profile comprises an extruded profile.

10. A support according to claim 1, wherein the hollow profile comprises a pultrusion profile.

11. A support according to claim 1, comprising further depressions in the shape of undercut grooves, to which further components belonging to the track floor conveyor are adapted to be fastened with slot nuts.

12. A support according to claim 1, wherein at least one said hollow space is filled with a material for reinforcement of the support.

13. A track floor conveyor comprising:
a weight bearing surface,
wheels and
at least one support with a hollow profile according to claim 1.

14. A track floor conveyor according to claim 13, wherein at least two said supports are connected by a support plate.

15. A track floor conveyor according to claim 13, wherein at least two said hollow profiles are arranged connected one above the other.

16. A track floor conveyor according to claim 13, further comprising at least one conveyor roller and a handle for manual transport.

* * * * *